United States Patent
Song

[11] Patent Number: 6,049,552
[45] Date of Patent: Apr. 11, 2000

[54] CHANNEL ALIGNMENT CIRCUIT

[75] Inventor: Hong-Jong Song, Seoul, Rep. of Korea

[73] Assignee: Hyundai Electronics Industries Co., Ltd., Rep. of Korea

[21] Appl. No.: 08/853,227

[22] Filed: May 8, 1997

[30] Foreign Application Priority Data

May 13, 1996 [KR] Rep. of Korea ...................... 96-15794

[51] Int. Cl.[7] ................................ H04J 3/06; H04J 3/04
[52] U.S. Cl. ............................................ 370/503; 370/535
[58] Field of Search .................................... 370/535, 536, 370/537, 538, 540, 542, 543, 544, 545, 509, 511, 512, 513, 514, 503; 348/385, 387

[56] References Cited

U.S. PATENT DOCUMENTS

| | | | |
|---|---|---|---|
| 3,890,469 | 6/1975 | Kelly et al. ............................... | 179/15 |
| 4,491,943 | 1/1985 | Iga et al. .................................... | 370/13 |
| 4,617,658 | 10/1986 | Walters ..................................... | 370/84 |
| 4,752,923 | 6/1988 | Allen et al. ............................... | 370/538 |
| 5,265,095 | 11/1993 | Fiedler et al. ........................... | 370/94.1 |
| 5,311,519 | 5/1994 | Getzlaff et al. .......................... | 370/112 |
| 5,646,957 | 7/1997 | Im et al. ................................... | 375/233 |
| 5,703,877 | 12/1997 | Nuber et al. ............................. | 370/395 |
| 5,754,526 | 5/1998 | Kaneko et al. .......................... | 370/217 |
| 5,870,441 | 2/1999 | Cotton et al. ............................ | 375/354 |

*Primary Examiner*—Ajit Patel
*Assistant Examiner*—Brian Nguyen
*Attorney, Agent, or Firm*—Lawrence G. Kurland, Esq.; Bryan Cave LLP

[57] ABSTRACT

A channel alignment circuit which is capable of separating six frame signals of 51.84 Mbps (Mega Bit Per Second) for six channels by expanding a control signal from a channel alignment block into three signals for a reframer of a cable television system. The circuit includes a CIB detector for detecting 51.84 Mbps of six descrambled channels and generating a 12-bit channel number data, a control signal generator for generating a 3-bit channel alignment control signal by using a 3-bit data among the channel number data from the CIB detector, and a channel alignment unit for separating the data inputted into six channels in accordance with a control signal from the control signal generator.

5 Claims, 4 Drawing Sheets

CHANNEL ALIGNMENT CIRCUIT

BACKGROUND OF THE INVENTION

1. Field of the Invention

The present invention relates to a channel alignment circuit, and in particular, to an improved channel alignment circuit which makes it possible to separate six frame signals of 51.84 Mbps (Mega Bit Per Second) for six channels by expanding a control signal from a channel alignment block into three signals for a reframer of a cable television system.

2. Description of the Conventional Art

Generally, in order to generate a 2-bit control input signal for a conventional channel alignment block, 12-bit channel number fields of 51.84 Mbps data frames of three channels are scanned.

Here, as the format of the channel number data of three channels, there are known a channel 1 formed of '0000 0000 0000', and a channel 2 formed of '0010 0100 1001', and a channel 3 of '1111 1111 1111'.

However, the conventional technique is directed to separating only three channels. Therefore, there is a limitation for adopting a predetermined number of channels.

SUMMARY OF THE INVENTION

Accordingly, it is an object of the present invention to provide a channel alignment circuit which overcomes the aforementioned problems encountered in the conventional art.

It is another object of the present invention to provide an improved channel alignment circuit which is capable of separating six frame signals of 51.84 Mbps (Mega Bit Per Second) for six channels by expanding a control signal from a channel alignment block into three signals for a reframer of a cable television system.

To achieve the above objects, there is provided a channel alignment circuit which includes a CIB detector for detecting 51.84 Mbps of six descrambled channels and generating a 12-bit channel number data, a control signal generator for generating a 3-bit channel alignment control signal by using a 3-bit data among the channel number data from the CIB detector, and a channel alignment unit for separating the data inputted into six channels in accordance with a control signal from the control signal generator.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
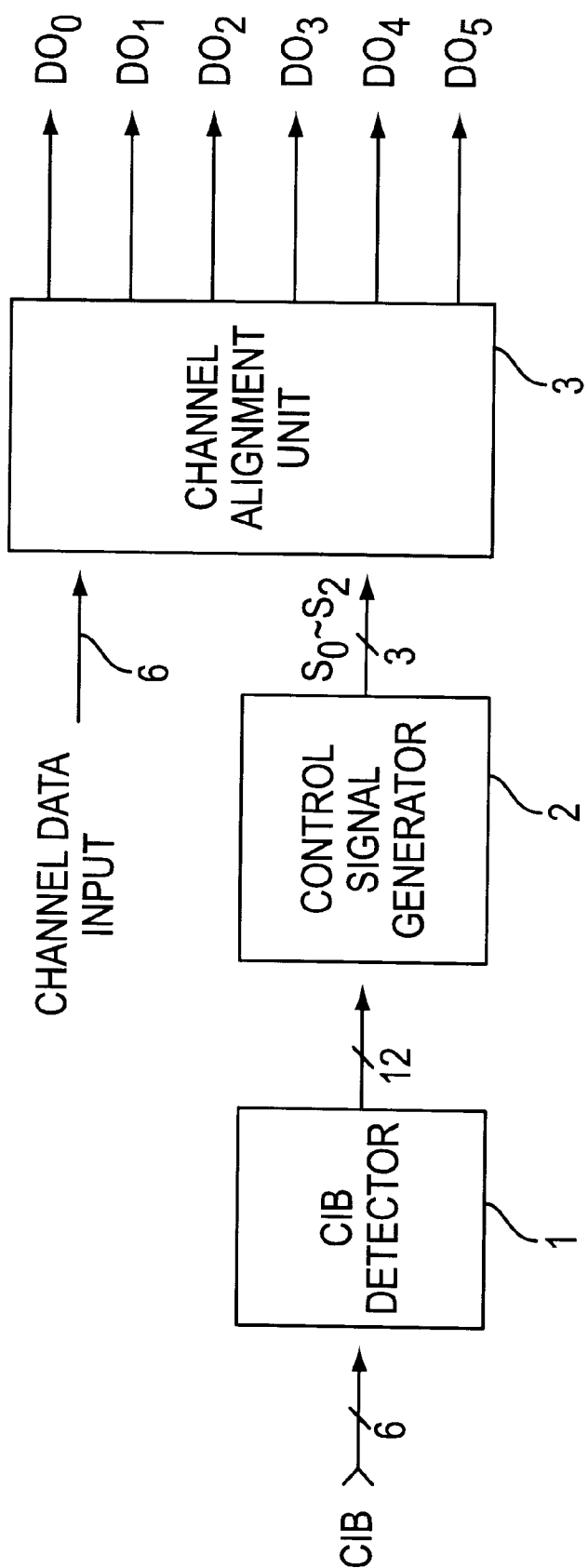
FIG. 1 is a block diagram illustrating a channel alignment circuit according to the present invention.

FIG. 1 illustrates a channel alignment circuit according to the present invention.

As shown therein, the channel alignment circuit according to the present invention includes a CIB detector 1 for detecting CIB of 51.84 Mbps of six channels which were descrambled and generating a 12-bit channel number data, a control signal generator 2 for generating a 3-bit channel alignment control signal by using a 3-bit data among the channel number data from the CIB detector 1, and a channel alignment unit 3 for separating the data inputted thereinto six channels in accordance with a control signal from the control signal generator 2.

In the channel alignment circuit according to the present invention, the CIB detector 1 detects a CIB inputted, and generates a 12-bit channel number data in accordance with the detected CIB.

The channel number data from the CIB detector 1 are formed as follows:

| Channel 1 | '0000 0000 0000' |
|---|---|
| Channel 2 | '0010 0100 1001' |
| Channel 3 | '0100 1001 0010' |
| Channel 4 | '1001 0010 0100' |
| Channel 5 | '1011 1001 1101' |
| Channel 6 | '1111 1111 1111' |

The 12-bit channel number data from the CIB detector 1 are inputted into the control signal generator 2.

The control signal generator 2 generates a 3-bit signals, for example, bit 2~bit 0, bit 5~bit 3, bit 8~bit 6 or bit 11~bit 9, which are capable of separating a channel from the 12-bit channel number data.

The 3-bit control signal generated by the control signal generator 2 is inputted into the channel alignment unit 3, and the channel alignment unit 3 separates inputted channel data in accordance with a 3-bit control signal.

Figure 2:
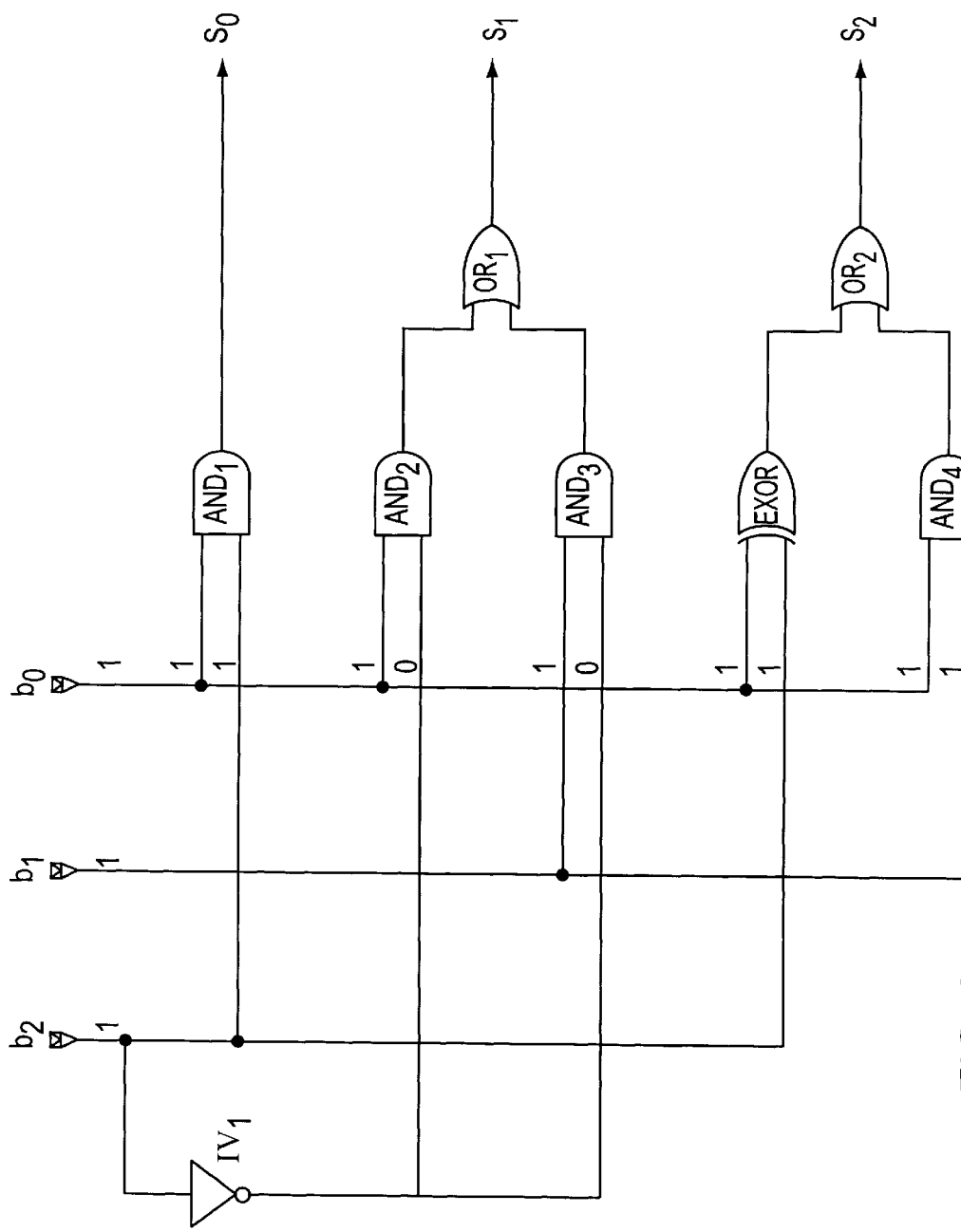
FIG. 2 is a detailed circuit diagram illustrating a control signal generator in the circuit of FIG. 1 according to the present invention.

FIG. 2 illustrates a control signal generator in the circuit of FIG. 1 according to the present invention.

As shown therein, the data b0 of the bit 0 from the CIB detector is inputted into the input terminals of an AND-gates AND1, AND2 and AND4 and an exclusive OR-gate EXOR, respectively. The data b1 of the bit 1 is inputted into the input terminals of the SMD-gates AND3 and AND4, respectively. The data b2 of the bit 2 is inputted into the AND-gate AND1 and the exclusive OR-gate EXOR, respectively, and the input terminals of the AND-gates AND2 and AND3 through an inverter IV1, respectively, so that a control signal S0 is outputted from the output terminal of the AND-gate AND1. The output terminals of the AND-gates AND2 and ADN3 are connected to the input terminal of an OR-gate OR1, respectively, so that a control signal S1 is outputted from the output terminal of the OR-gate OR1. The output terminals of the exclusive OR-gate EXOR and an AND-gate AND4 are connected to the input terminal of the OR-gate OR2, so that a control signal S2 is outputted from the output terminal of the OR-gate OR2.

Figure 3:
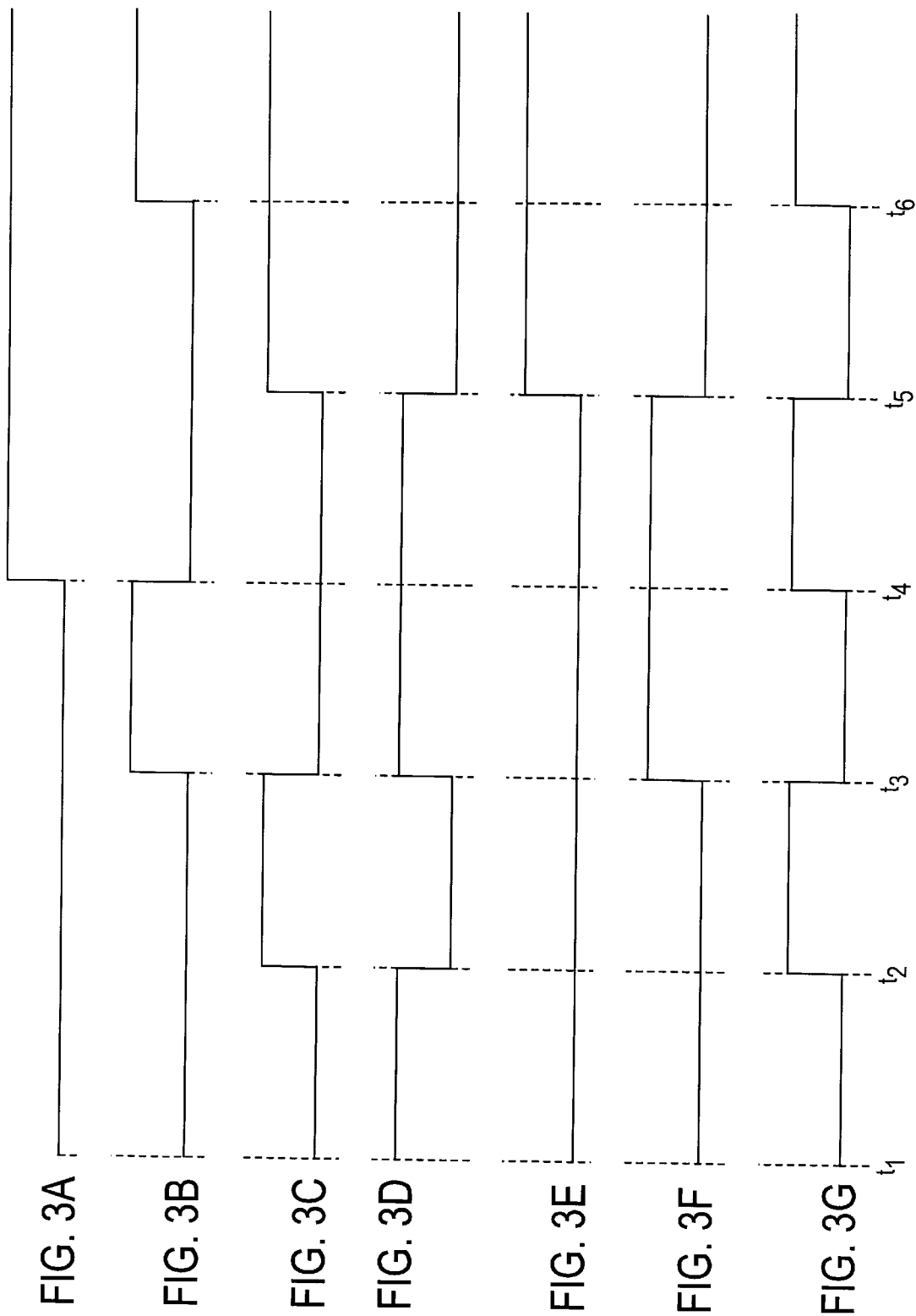
FIGS. 3A through 3G are waveform diagrams of signals from elements in the circuit of FIG. 2 according to the present invention.

As shown in FIGS. 3A through 3C, in the control signal generator 2, when the low level data b0, b1, and b2 of the bit 0, bit 1, and bit 2 are all inputted at a time t1, the data b0 of the bit 0 is inputted into the input terminals of the AND-gates AND1, AND2 and AND4 and the exclusive OR-gate EXOR, respectively. In addition, the data b1 of the bit 1 is inputted into the input terminals of the AND-gates AND3 and AND4, respectively. The data b2 of the bit 2 is inputted into the AND-gate AND1 and the exclusive OR-gate EXOR, respectively, and is inverted by the inverter IV1 as shown in FIG. 3D and then is inputted into the input terminals of the AND-gates AND2 and AND3.

Therefore, since a low level control signal S0, as shown in FIG. 3E, is outputted from the AND-gate AND1, and a low level signal is outputted from the AND-gates AND2 through AND4 and the exclusive OR-gate EXOR, the OR-gates OR1 and OR2 output low level control signals S1 and S2 as shown in FIGS. 3F and 3G.

In addition, when the low level data b0 and b1 of the bit 0 and bit 1 are inputted at a time t2, and the high level data b2 of the bit 2 is inputted, the AND-gate AND1 outputs a high level control signal S0 as shown in FIG. 3E, and the AND-gates AND2 through AND4 output low level data, and the exclusive OR-gate EXOR outputs a high level data. Therefore, the OR-gate OR1 outputs a low level control signal S1 as shown in FIG. 3F, and the OR-gate OR2 outputs a high level control signal S2.

When the low level data b0 and b1 of the bit 0 and bit 2 are inputted at a time t3, and a high level data b1 of the bit 1 is inputted, the AND-gate AND1 outputs a low level control signal S0, and the AND-gates AND2 and AND4 and the exclusive OR-gate EXOR output low level data, and the AND-gate AND3 outputs a high level data. Therefore, the OR-gate OR1 outputs a high level control signal S1, and the OR-gate OR2 outputs a low level control signal S2.

When the high level data b0 of the bit 0 is inputted, and the low level data b1 and b2 of the bit 1 and bit 2 are inputted, respectively, at a time t4, the AND-gate AND1 outputs a low level control signal S0, and the AND-gates AND2 and AND4 output low level data, and the AND-gate AND3 and the exclusive OR-gate EXOR output high level data. Therefore, the OR-gates OR1 and OR2 output a high level control signals S2, respectively.

When the data b0 and b2 of the bit 0 and bit 2 are inputted, and the low level b1 of the bit 1 is inputted, respectively, at a time t5, the AND-gate AND1 outputs a high level control signal S0, and the AND-gates AND2 through AND4 and the exclusive OR-gate EXOR output low level data, so that the OR-gates OR1 and OR2 output low level control signals S1 and S2.

When the high level data b0 through b3 of the bits 0 through 3 are inputted at a time t6, the AND-gate AND1 outputs a high level control signal S0, and the AND-gates AND2 and AND3 and the exclusive OR-gate EXOR output low level data, and the AND-gate AND4 outputs a high level data, so that the OR-gate OR1 outputs a low level control signal S1, and the OR-gate OR2 outputs a high level control signal S2.

So far, the operations that the control signal generator 2 generated the control signals S0 through S2 in accordance with a low 3-bit signal, namely, the bits 0 through 2 b0 through b2, among the 12-bit channel number data from the CIB detector 1 were explained. In the present invention, the configuration of the control signal generator 2 may be changed based on the bits among the 12-bit channel number data without departing from the scope and spirit of the present invention.

Figure 4:
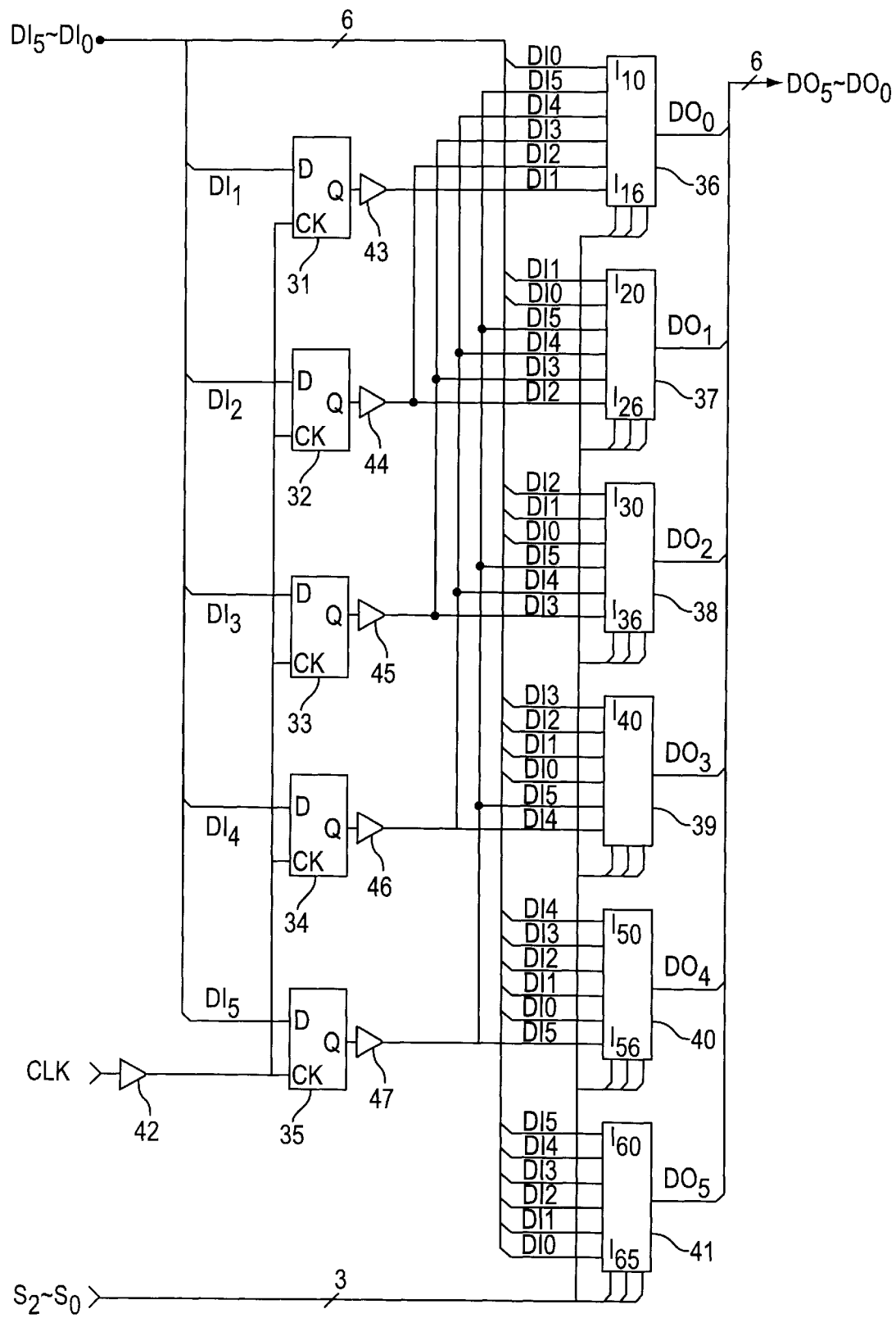
FIG. 4 is a detailed circuit diagram illustrating a channel alignment unit in the circuit of FIG. 1 according to the present invention.

FIG. 4 illustrates a channel alignment unit in the circuit of FIG. 1 according to the present invention.

As shown therein, channel data signals DI1 through DI5 are inputted into the input terminals of flip-flop units 31 through 35. The clock terminals CK of the flip-flop units 31 through 35 receive a clock signal CLK, respectively. The output terminal Q of the flip-flop unit 31 is connected to the input terminal I16 of a multiplexor 36, and the output terminal Q of the flip-flop unit 32 is connected to the input terminals I15 and I26 of the multiplexors 36 and 37, respectively. The output terminal Q of the flip-flop unit 33 is connected to the input terminals I14, I25 and I36 of the multiplexors 36 through 38, respectively. The output terminal Q of the flip-flop unit 34 is connected to the input terminals I13, I24, I35 and I46 of the multiplexors 36 through 39, respectively. In addition, the output terminal Q of the flip-flop unit 35 is connected to the input terminals I12, I23, I34, I45 and I56 of the multiplexors 36 through 40.

In addition, channel data signals DI0 through DI5 are inputted into input terminals I10 through I60 of the multiplexors 36 through 41. The channel data signals DI0 through DI4 are inputted into input terminals I21 through I61 of multiplexors 37 through 41. The channel data signals DI0 through DI3 are inputted into the input terminals I32 through I62 of the multiplexors 38 through 41. The channel data signals DI0 through DI2 are inputted into input terminals I43 through I63 of the multiplexors 39 through 41. In addition, the channel data signals DI0 and DI1 are inputted into input terminals I54 through I64 of the multiplexors 40 and 41. The channel data signal DI0 is inputted into input terminal I65 of the multiplexor 41. The multiplexors 36 through 41 outputs channel data signals DO0 through DO5 in accordance with control signals S0 through S2.

In FIG. 4, reference numerals 42 through 47 denote buffers.

In the channel alignment unit 3 according to the present invention, since the channel data signals DI0 through DI5 are inputted into the input terminals of the lip-flip units 31 through 35, and the clock signal CLK is inputted into the clock terminals CK of the flip-flop units 31 through 35 through the buffer 42, the flip-flop units 31 through 35 delay the output signals, namely, the channel data signals DI1 through DI5 by one cycle in accordance with the clock signal CLK.

Therefore, the data signal from the flip-flop unit 31 is inputted into the input terminal I16 of the multiplexor 36. The output signal from the flip-flop unit 32 is inputted into the input terminals I15 and I26, respectively, of the multiplexors 36 and 37. The output signal from the flip-flop unit 33 is inputted into the input terminals I14, I25 and I36, respectively, of the multiplexors 36 through 38. The output signal from the flip-flop unit 34 is inputted into the input terminals I13, I24, I35 and I46, respectively, of the multiplexors 36 through 39. The output signal from the flip-flop unit 35 is inputted into the input terminals I12, I23, I34, I45 and I56, respectively, of the multiplexors 36 through 40.

In addition, the channel data signals DI0 through DI5 are inputted into the input terminals I10 through I60 through the multiplexors 36 through 41. The channel data signals DI0 through DI4 are inputted into the input terminals I21 through I61 of the multiplexors 37 through 41. The channel data signals DI0 through DI3 are inputted into the input terminals I32 through I61 of the multiplexors 38 through 41. The channel data signals DI0 through DI2 are inputted into the input terminals I43 through I63 of the multiplexors 39 through 41. The channel data signals DI0 and DI1 are inputted into the input terminals I54 through I64 of the multiplexors 40 and 41. The channel data signal DI0 is inputted into the input terminal I65 of the multiplexor 41.

In the above-described state, when low level control signals S0 through S2 are all inputted, the multiplexors 36 through 41 select the signals from the input terminals I10 through I60, and the multiplexors 36 through 41 output the channel data signals DI0 through DI5 which were not delayed.

In addition, when low level control signals S0 and S1 are inputted, and a high level control signal S2 is inputted, the multiplexors 36 through 41 select and output the signals from the input terminals I11 through I61, and the multiplexors 37 through 41 select and output the channel data signals DI0 through DI4 which were not delayed, and the multiplexor 36 selects and outputs the channel data signal DI5 which was delayed by the flip-flop unit 31.

When low level control signals S0 and S2 are inputted, and a high level control signals S1 is inputted, the multiplexors 36 through 41 select and output the signals from the input terminals I12 through I62. In addition, the multiplexors 38 through 41 select and output the channel data signals DI0 through DI3 which were not delayed. In addition, the multiplexors 36 and 37 select and output the channel data signals DI4 and DI5 delayed by the flip-flip units 31 and 32.

When a low level control signal S0 is inputted, and high level control signals S1 and S2 are inputted, the multiplexors 36 through 41 select and output the signals from the input terminals I13 through I63. The multiplexors 39 through 41 select and output the channel data signals DI0 through DI2 which were not delayed. In addition, the multiplexors 36 through 38 select and output the channel data signals DI3 through DI5 delayed by the flip-flop units 31 through 33.

When a high level control signal S0 is inputted, and low level control signals S1 and S2 are inputted, the multiplexors 36 through 41 select and output the signals from the input terminals I14 through I64. In addition, the multiplexors 40 and 41 select and output the channel data signals DI0 and DI1 which were not delayed. In addition, the multiplexors 36 through 39 select and output the channel data signals DI2 through DI5 delayed by the flip-flop units 31 through 34.

When high level control signals S0 through S2 are inputted, the multiplexors 36 through 41 select and output the signals from the input terminals I15 through I65. In addition, the multiplexor 41 selects and outputs the channel data signal DI0 which was not delayed. In addition, the multiplexors 36 through 40 select and output the channel data signals DI1 through DI5 delayed by the flip-flop units 31 through 35.

As described above, the channel alignment circuit according to the present invention is directed to separating six channels, so that a user can variously select the channel by using several frames for the identical serial data.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A channel alignment circuit, comprising:

a Channel Identification Bits (CIB) detector for detecting 51.84 Mbps of six descrambled channels and generating a 12-bit channel number data;

a control signal generator for generating a 3-bit channel alignment control signal by using a 3-bit data among the channel number data from the CIB detector; and a channel alignment unit for separating the data inputted into six channels in accordance with a control signal from the control signal generator.

2. The circuit of claim 1, wherein said control signal generator uses a lower 3-bit data.

3. The circuit of claim 1, wherein said control signal generator includes:

AND-gates for selectively ANDing bit signals from the CIB detector;

AND-gates for selectively ANDing partially inverted bit signals from the CIB detector;

an exclusive OR-gate for selectively and exclusively ORing bit signals from the CIB detector;

an OR-gate for ORing outputs from the AND-gates and outputting a control signal; and an OR-gate for ORing outputs from the exclusive OR-gate and the AND-gate and outputting a control signal.

4. The circuit of claim 2, wherein said control signal generator includes:

AND-gates for selectively ANDing bit signals from the CIB detector;

AND-gates for selectively ANDing partially inverted bit signals from the CIB detector;

an exclusive OR-gate for selectively and exclusively ORing bit signals from the CIB detector;

an OR-gate for ORing outputs from the AND-gates and outputting a control signal; and an OR-gate for ORing outputs from the exclusive OR-gate and the AND-gate and outputting a control signal.

5. The circuit of claim 1, wherein said channel alignment unit includes:

a plurality of flip-flop units for delaying a channel data signal by one cycle of a clock signal;

a plurality of buffers for buffering outputs from the flip-flop units; and a plurality of multiplexors for selecting a signal from the input terminal in accordance with levels of the control signals.

* * * * *